United States Patent [19]

Reinold et al.

[11] Patent Number: 4,669,430

[45] Date of Patent: Jun. 2, 1987

[54] SYSTEM AND METHOD TO CONTROL ENERGY SUPPLY TO AN ELECTRICALLY HEATED ZONE

[75] Inventors: Martin Reinold, Schwieberdingen; Peter Schmidt, Renningen, both of Fed. Rep. of Germany

[73] Assignee: Robert Bosch GmbH, Stuttgart, Fed. Rep. of Germany

[21] Appl. No.: 769,873

[22] Filed: Aug. 27, 1985

[30] Foreign Application Priority Data

Sep. 12, 1984 [DE] Fed. Rep. of Germany ....... 3433367

[51] Int. Cl.[4] ........................ F02P 19/02; G05D 23/19

[52] U.S. Cl. .......................... 123/179 BG; 123/179 H; 123/145 A; 219/497; 219/509

[58] Field of Search ........... 123/145 R, 145 A, 179 B, 123/179 BG, 179 H; 219/492, 493, 497, 504, 505, 507, 509, 519

[56] References Cited

U.S. PATENT DOCUMENTS

| | | | |
|---|---|---|---|
| 4,300,491 | 11/1981 | Hara et al. | 123/179 H X |
| 4,307,689 | 12/1981 | Raeske et al. | 123/179 H |
| 4,458,639 | 7/1984 | Abe et al. | 123/145 A |
| 4,516,543 | 5/1985 | Abe et al. | 123/179 BG |

FOREIGN PATENT DOCUMENTS

| | | | |
|---|---|---|---|
| 0002471 | 1/1982 | Japan . | |
| 0065976 | 4/1983 | Japan | 123/145 A |
| 0034435 | 2/1984 | Japan . | |
| 2042193 | 9/1980 | United Kingdom | 123/145 A |

*Primary Examiner*—Willis R. Wolfe, Jr.

*Attorney, Agent, or Firm*—Frishauf, Holtz, Woodman & Woodard

[57] ABSTRACT

Electrical energy being supplied to an electrical heater, typically a glow plug within an internal combustion engine (ICE), is easily and simply controlled by controlling the duty cycle or ON/OFF duration of a switch (10) serially connected between the glow plug (11) and a supply voltage source, for example a vehicular battery ($U_{Batt}$). An operational amplifier (15) controls the duty cycle of the switch (10) by comparing a periodically varying voltage **(37*a*) derived from a stabilized frequency or pulse generator (30) with battery voltage ($U_{Batt}$) and, at the cross-over points, respectively changing the switching condition of the switch. Upon drop in battery voltage, the switch will be longer in an ON position than at a higher battery voltage, so that the average voltage, over a plurality of cycles, across the glow plug (11)**, will have a value ($U_{KEM}$) which will result in a predetermined temperature thereof.

20 Claims, 1 Drawing Figure

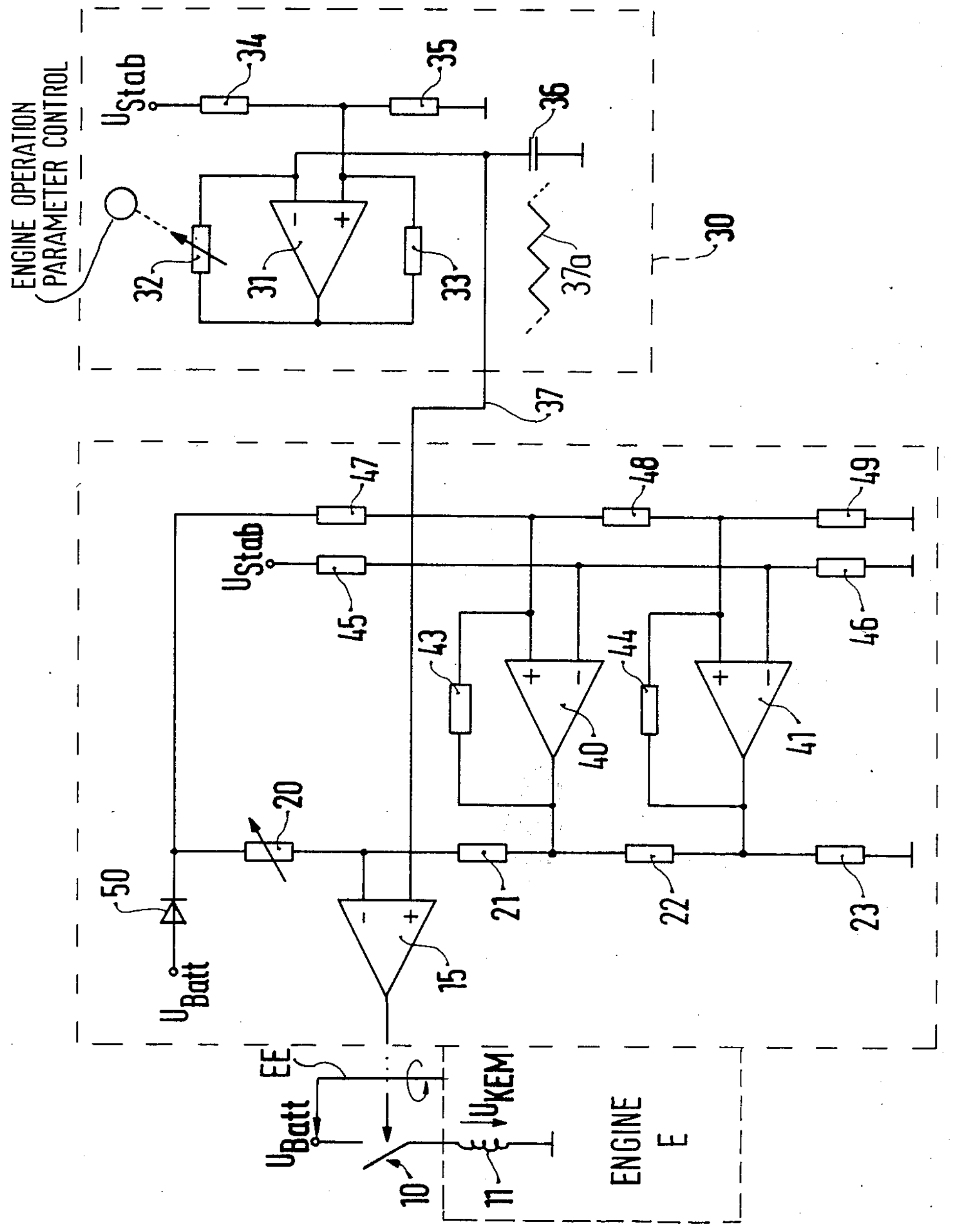
ENGINE OPERATION PARAMETER CONTROL
U Stab
34
35
36
32
31
33
37a
30
37
47
48
49
U Stab
45
46
43
40
44
41
50
20
21
22
23
15
U Batt
EE
U Batt
U KEM
10
11
ENGINE
E

SYSTEM AND METHOD TO CONTROL ENERGY SUPPLY TO AN ELECTRICALLY HEATED ZONE

The present invention relates to a system and to a method to supply electrical energy to an electrically heated zone in which an electrical heating element is used which, when supplied with a voltage at a predetermined level, provides, in operation, a predetermined heat output, and more particularly to a system and method to control the supply of electrical energy to glow plugs used in internal combustion engines, typically Diesel engines.

BACKGROUND

It has previously been proposed to control the energy supply, that is, electrical energy, to a glow plug for use in a Diesel engine, especially an automotive-type Diesel engine. It is possible to provide a simulated circuit which simulates the temperature-resistance curve or the temperature-voltage supply curve of operation of the glow plug, in order to prevent overheating of the glow plug and damage thereto under various environmental conditions, including excess voltage supply conditions, for example. The simulating circuit then is so arranged that it controls supply and disconnection of energy to the glow plug in accordance with the temperature characteristics thereof, that is, permits connection of electrical power to the glow plug only to the extent which is necessary to insure optimum operation of the glow plug. The ON and OFF switching conditions, within respective switching cycles, can be controlled to define predetermined upper and lower temperatures which the glow plug may assume, that is, when the glow plug reaches an upper temperature, energy supply is turned OFF, to be again turned ON when the temperature of the glow plug has dropped below a lower limit.

Circuits which simulate the temperature characteristics of a glow plug are complex. It is, therefore, difficult to form an analog simulation of the glow plug at reasonable expense. Further, it is necessary to calibrate the circuit before it is used. In spite of calibration, and setting of the circuit to match various conditions, it has been found that the control of the switching cycle is imprecise. Optimal control of the temperature of the glow plug, by use of simulation circuitry, or mathematical models which are stored in circuitry, thus is not readily possible.

THE INVENTION

It is an object to provide a simple circuit, and a simple control method, to control the energy to be supplied to a heated zone by an electrical heater, typically—but not restricted to—a glow plug of an internal combustion engine, which is simple and reliable.

Briefly, the average supply voltage required to maintain an electrical heater, typically the glow plug, at a predetermined temperature is determined. A supply voltage at the level which is at least as high as that of the average supply voltage is supplied and the switching period or switching cycle relation of a controlled switch is controlled as a function of the required average supply voltage, as determined.

The determination of the average supply voltage necessary for the heater element, typically the glow plug, to obtain the required temperature can easily be determined experimentally. It is then only necessary to insure that only that voltage, and no other, is supplied—on the average, or as an effective energy level—to the heater element, for example the glow plug.

The system can easily be expanded by making it dependent on the supply voltage which is available, for example the voltage level of an automotive battery.

The system and method has the advantage that the circuit necessary to control the switching cycle or duty cycle of the switch which connects and disconnects energy to the heater element can be easily built and assembled of cheap circuit components, while permitting optimum control of energy supply to the heated element, typically a glow plug. Further, the conditions of ON and OFF states of the supply circuit can be made dependent on a desired average supply voltage, resulting in an effective energy supply to the heater element, for example the glow plug, which, if so supplied, will result in a predetermined and known temperature of the heater element, that is, the glow plug.

In accordance with a preferred feature of the invention, the ON and OFF switching conditions of the circuit are made dependent on the battery supply voltage supplying the entire system. It is also possible to preset the repetition frequency of the ON and OFF switching conditions of the circuit, typically of a relay therein.

DRAWING

The single FIGURE represents a circuit diagram of the system to carry out the method.

DETAILED DESCRIPTION

The invention will be described in connection with the supply of electrical energy to the glow plug in an automotive-type internal combustion engine, although it is not limited thereto. The arrangement and the circuit is suitable, generally, with various types of internal combustion engines and various types of temperature supply at selected points or zones. The particular formation of the heated zone—in an internal combustion engine the cylinder head—is not material. Various changes may be made within the circuitry to be described, and the particular circuit is illustrative, showing a preferred embodiment which can be built with a minimum of well known and readily available circuit components.

A controlled switch 10, which for example may be a solid-state or mechanical relay, or any other type of suitable controlled switch is serially connected with a resistance heating element, shown schematically at 11, which, for example, may be an automotive-type glow plug. Switch 10 and heater 11 are serially connected with a source of power supply, shown as $U_{Batt}$, the opposite terminal of which is connected to ground or chassis.

Switch 10 is controlled to close or ON position and released therefrom, for example by a spring, to open or OFF position. Control of the operation of the switch is obtained by an operational amplifier 15. Intermediate connecting elements, such as buffer amplifiers, drivers and the like, to provide the necessary output power, for example for a mechanical relay for switch 10, have been omitted from the drawing since they are standard technology and well known in this technical field. Thus, various additional circuit elements may be included between tbe control line for the controlled switch 10 and the output of operational amplifier 15.

A group of resistors 20, 21, 22, 23 are serially connected between the battery terminal $U_{Batt}$ and ground or chassis, to form a multi-stage voltage divider. Resistor 20 is a variable resistor, and connected to the inverting input of the control operational amplifier 15. At the junction thereof, resistor 21 is connected. The direct input of operational amplifier 15 is connected to the output signal of a pulse generator 30. Pulse generator 30 is constructed of an operational amplifier 31, the output of which is connected through a variable resistor 32 to the inverting input thereof. A resistor 33 is connected to the direct input of the operational amplifier from its output. The pulse generator 30 further includes a series circuit formed of two resistors 34, 35, and defining a voltage divider. The voltage divider is supplied with a stabilized voltage $U_{Stab}$, the other terminal of which is connected to ground or chassis. The junction of the resistors 34, 35, forming a tap point of the voltage divider, is connected to the diode input of the operational amplifier 31. A capacitor 36 is connected between the inverting input and ground or chassis.

The output signal of the pulse generator 30 is available at a line or terminal 37, and is derived from the inverting input of the operational amplifier 31.

Two further operational amplifiers 40, 41 are provided; the output signal of operational amplifier 40 is connected to the junction of the resistors 21, 22; the output signal of operational amplifier 41 is connected to the junction of the resistors 22, 23. The output of the respective operational amplifiers are connected back to the direct inputs through resistors 43, 44, respectively. Resistors 45, 46, serially connected between a source of stabilized voltage $U_{Stab}$, form a voltage divider, the junction of which is connected to the inverting inputs of the operational amplifiers 40, 41. A second group of serially connected resistors 47, 48, 49 is provided, forming a two-stage voltage divider, and connected to the supply voltage $U_{Batt}$. The supply voltage $U_{Batt}$ may vary. The stabilized voltage $U_{Stab}$ is stabilized in any suitable manner, for example by a Zener diode, not shown. The junction between resistors 47, 48 is connected to the direct input of operational amplifier 40; the junction between resistors 48, 49 is connected to the direct input of operational amplifier 41. The terminals of the various voltage dividers remote from the supply voltage are all connected to ground or chassis. A protective, polarity-determining diode 50 has its anode connected to the supply voltage terminal $U_{Batt}$, and its cathode to the respective voltage dividers 20, 21, 22, 23 and 47, 48, 49.

OPERATION

The pulse generator 30 is a well known multi-vibrator circuit which, at its output 37, provides an output voltage which varies essentially with a triangular wave shape. The direct input of operational amplifier 15, thus, will have a voltage applied thereto which changes, cyclically, between a higher and a lower value. The frequency of the voltage is freely selectable by changing the R/C ratio of resistor 32 and capacitor 36 of the pulse generator 30, that is, by changing the resistance value of the variable resistor 32. The inverting input of the control operational amplifier 15 has a direct voltage applied thereto, the level of which depends on the battery voltage $U_{Batt}$, and on the value of the resistance of resistor 20, which is variable, and can be adjusted. The operational amplifier 15 acts as a comparator and compares the alternating or cyclically varying voltage at the direct input with the voltage of the inverting input, which is a d-c supply. The coincidence points of the undulating or varying voltage with the direct voltage then define the switching points or switching states of the operational amplifier, and are available as the output signal from the operational amplifier 15. In the actual circuit, the switch 10 is opened and closed in dependence on the voltages which are applied to the inputs of the operational amplifier; the series circuit 10, 11 will be closed, that is, the switch 10 is ON when the voltage at the direct input of the operational amplifier 15 is higher than the d-c voltage at the inverting input; the switch 10 will open or will be OFF when the changing voltage from the pulse source 30 is less than the d-c voltage at the inverting input.

If the voltage supplied by the battery, that is, voltage $U_{Batt}$, changes, for example drops, the voltage at the inverting input of the control operational amplifier 15 likewise will drop. Consequently, the alternating voltage from the pulse source 30, supplying the triangular output pulses, will be greater than the d-c voltage at the inverting input for a longer period of time, thus maintaining the switch 10 ON or closed for a longer period of time. The smaller supply voltage $U_{Batt}$, thus, is compensated by a longer ON period of the switch 10.

The foregoing, cyclically repetitive change of the switch 10, thus, will supply to the heater 11, typically a glow plug, an average voltage $U_{KEM}$, regardless of the voltage of the battery $U_{Batt}$, and the voltage $U_{KEM}$ will be maintained constant even if the voltage $U_{Batt}$ changes. The average glow plug voltage $U_{KEM}$ can be freely selected by suitably setting the resistor 20.

EXAMPLE

Let it be assumed that the average or design voltage of the glow plug, that is, voltage $U_{KEM}$, for a given temperature is 9 V. The repetition frequency of the output signal from the pulse generator 30 can be selected as t=1000 ms. The equation $$U_{KEM} \doteq U_{Batt} \cdot \sqrt{t_{ON}/t_C} \quad (1)$$

will result in an ON of the circuit of $t_{ON}$ 562.5 ms. In the above equation, $t_C$ is the overall repetition frequency, assumed to be 1000 ms. The OFF period of the period, then, will be $t_{OFF}$ of 1000−562.5=437.5 ms.

The variable resistor 32 can be used by the operator of the system, or the user, to first set the overall or cycle time $t_C$ of 1000 ms; the variable resistor 20 is then set in order to control the ON time, $t_{ON}$, to 562.5 ms, if, under those conditions and with a battery voltage of 12 V and a glow plug voltage of $U_{KEM}$ 9 V, the desired temperature will be obtained under equilibrium conditions.

It is then only necessary for the user to consider that the voltage $U_{Batt}$ during initial calibration does not depart from the calibration or reference value of 12 V.

If, after first setting the circuit, the battery voltage later on varies, the temperature of the resistance element 11, or the glow plug, will not change since, as has bee described above, the ON period of the switch will be longer, or shorter, respectively. The ON/OFF cycling of the switch 10 will always be such that the average voltage $U_{KEM}$ across the glow plug 11 is a constant value of 9 V.

The average voltage across the resistance element 11, that is, voltage $U_{KEM}$, will be in accordance with the equation (1) above. This equation, as is readily apparent, is a quadratic equation. The circuit, so far described, is a linear circuit and, in order to more closely approximate the operation of the circuit to the actual mathematical quadratic equation, the additional circuitry provided by the operational amplifier 40, 41 and associated resistance networks, is provided. If the battery voltage $U_{Batt}$ deviates from, for example, the nominal value of 12 V assumed in the above example, the ON/OFF duration of the switch 10 will change in such a manner that the average heater voltage $U_{KEM}$ retains the value of 9 V, based, however, on linear influence on the switch 10, not in a quadratic relationship. Actually, therefore, if as the variation becomes more than nominal from the value of 9 V, errors will arise. The operational amplifier 40, 41 and associated circuitry are provided to reduce this error to a level which, in actual operating circuits, is insignificant.

The resistors 45, 46 form a voltage divider which is supplied with the stabilized voltage $U_{Stab}$. If the battery voltage $U_{Batt}$ is high, the two operational amplifiers 40, 41 will have a high output at their respective output terminals since the resistors 47, 48, 49, connected to the direct inputs, will also have a comparatively high value, which will be higher than the switching threshold defined by the junction or tap point of the voltage divider 45, 46. As the battery voltage $U_{Batt}$ decreases, the operational amplifier 41 will switch over to provide a zero voltage output at its output terminal, that is, the output terminal of the operational amplifier 41 will go to ground or chassis. The cross-over point at which the operational amplifier switch switches over is determined by the releative values of the voltages at the tap points of the voltage divider 45, 46 and the voltage divider formed by the resistors 47, 48, 49. No more voltage drop will then occur across the resistor 23—the voltage at the output of operational amplifier 41 having changed to ground or chassis level—and thus the voltage at the inverting input at the operational amplifier 15 will increase. The result will be a voltage of the d-c voltage at the inverting input of the operational amplifier 15 which will simultaneously change the duty cycle or ON/OFF interval relationship of the switch 10 in such a manner that the ON period will be increased by some value and, hence, the average heater voltage $U_{KEM}$ will be accordingly influenced. Upon further drop of battery voltage $U_{Batt}$, operational amplifier 40 will also switch its output to ground or chassis, thus further increasing the voltage level at the inverting input of the operational amplifier and further increasing the ON duration of the switch 10.

The circuit connections of the two operational amplifiers 40, 41, and particularly the selection of the switch-over points of the operational amplifier 40, 41, are preferably so selected that the average voltage across the resistance heater, that is, voltage $U_{KEM}$, deviates as little as possible from the selected value, in the example 9 V. The two operational amplifiers 40, 41 thus modify the linear relationship between the heater supply voltage $U_{KEM}$ and the battery voltage $U_{Batt}$ to a somewhat quadratic relationship or, at least, approximately quadratic relationship.

The circuit described can be easily expanded by using a chain of operational amplifiers, connected similarly to the operational amplifiers 40, 41 and operating as described in connection with the operational amplifiers 40, 41. Increasing the number of operational amplifiers in the chain—which increases, also, the number of resistors of the voltage dividers 47, 48, 49, more closely approximates the actual operating function with that of a quadratic relationship of the average voltage $U_{KEM}$ across the resistance element 11 with respect to change in battery voltage $U_{Batt}$. The accuracy of maintaining the average voltage $U_{KEM}$ across the resistance element 11, typically the glow plug, can thus be suitably obtained, and maintained even under widely varying battery voltage conditions.

It is also possible to change the pulse frequency or repetition frequency of the pulse generator 30. Ordinarily, the pulse or repetition frequency is set once by the variable resistor 32. It is, however, also possible to vary this repetition frequency, for example in dependence on operating parameters of the glow plug, or of an internal combustion engine in which it is used. It is a particular advantage of the circuit that, by changing, and especially increasing the operating frequency of the pulse generator 30, the ON/OFF voltage states of the switch 10 can be influenced to minimize the variations between maximum and minimum tolerance bands of the voltage $U_{KEM}$ in view of the variation which the battery voltage $U_{Batt}$ may be subjected to.

The control system as described can be used with various types of energy supply arrangements which are to maintain a specific temperature, developed by an electrical heating element at a specific level. The structure is simple, and all components, that is, operational amplifiers and resistors, can be forned on an integrated circuit; the capacitor 36, likewise, can be easily assembled therewith. The control system and method can be used under any operating conditions of a Diesel engine, in which glow plugs forming resistance elements 11, for example, are incorporated. The control unit and method is particularly applicable, however, under the operating conditions referred to as post-heating or post-glowing, which may be used under certain operating conditions and while the engine is running. In an automotive vehicle, the running engine drives an alternator which, in turn, charges the battery which supplies the voltage $U_{Batt}$ so that, even though post-glowing or after-glowing is desired, the battery voltage may rise due to energy being supplied from the alternator and exceed values which the glow plugs can stand or accept for an appreciable period of time. The temperature of the glow plug might also rise impermissibly. The circuit, therefore, provides for control of the energy being supplied to the glow plug to maintain the temperature at the level which is desired, and defined by energy supply at the voltage level $U_{KEM}$.

Various changes and modifications may be made within the scope of the inventive concept.

For example, the system and method is particularly suitable for incorporation in a Diesel engine, shown schematically by the broken-line box E, and having an output shaft coupled to an electrical generating system, schematically shown merely at EE and providing output energy to a vehicular battery which, in turn, is connected to the terminal $U_{Batt}$. The variation of the repetition rate or frequency of the periodically varying output signal 37*a*, shown within block 30, as a function of engine operating parameter, which, of course, affects battery voltage, is preferably interlocked with operation of the engine, for example through a main engine operating switch, so that, with the engine stopped, the value of the potentiometer 32 will be set to a predetermined level. The potentiometer 32, then, can be changed to keep fluctuations of battery voltage, for example due to fluctuations in engine speed which are reflected in fluctuations of the speed of an alternator driven thereby, to a minimum.

In an operating example, the resistance element 11 was a glow plug of the type: 0250201005 having a nominal voltage $U_{KEM}$ of 10.5 V. Operational amplifier 15 was: LM2904. Operational amplifiers 40, 41, were: LM2903. The resistors 20, 21, 22 had a value of:

resistor 20, variable between ca. 70K

21: 19.1K 1%

22: 1.3K 1%

23: 1.1K 1%

A suitable stabilized voltage $U_{Stab}$ was: 5.6 V±2% and the voltage at the tap point between the voltage divider 45, 46 and applied to the inverting input of operational amplifiers 40, 41 was: 2.8 V. The resistors 47, 48, 49 of the voltage divider connected to the battery, which was a 12 V nominal automotive-type battery, had resistance values of:

47: 91K 1%

48: 5.1K 1%

49: 68K 1%

What is claimed is:

1. A method of controlling the temperature of an electrical heater (11) to have a desired predetermined temperature value upon being supplied with electrical energy from a supply voltage source ($U_{Batt}$), wherein a controlled electrical switch (10) is serially connected between the heater (11) and the supply voltage source ($U_{Batt}$), and means (15, 30) for periodically switching the controlled switch between closed (ON) and open (OFF) position, connected to and controlling the controlled switch (10), comprising the steps of deriving a measured heater voltage value ($U_{KEM}$) which, when applied to the heater, will result in said desired predetermined temperature of the heater;

providing said supply source voltage at a level at least as high as said average heater supply voltage; and controlling, by said periodic switching means, the periodic switching cycle of the controlled switch to furnish a switched output from said controlled switch which has an average value corresponding at least approximately to said measured heater voltage.

2. The method of claim 1, including the step of sensing the supply source voltage level;

and wherein the step of controlling the period switching cycle comprises changing the periodic switching cycle as a function of change in supply source voltage level.

3. Method according to claim 1, wherein the electrical heater comprises a glow plug (11), installed in an internal combustion engine (E);

including the step of determining an engine operating or operation parameter;

and controlling the periodic switching of the controlled switch (10) as a function of said engine operating or operation parameter.

4. Control system to control supply of electrical energy from a supply battery source ($U_{Batt}$) to an electrical heater (11) having a controlled switch (10) serially connected between the heater and the supply voltage source, and means (15, 30) connected to the controlled switch and controlling periodic switching of the controlled switch between closed (ON) and open (OFF) position, comprising means for controlling the periodic switching cycle of the controlled switch as a function of voltage across the electrical heater (11) required to maintain the heater at a predetermined temperature, said means being responsive to the supply source voltage level and varying the periodic switching of the controlled switch to maintain the average voltage across said electrical heater at the level required to maintain the heater at said predetermined temperature, said means to maintain the voltage across the heater at a predetermined level ($U_{KEM}$) to maintain the heater at said predetermined temperature comprising means (30) for providing a predetermined reference signal representative of said voltage across the electrical heater (11) required to maintain the heater at said predetermined temperature;

and comparator means (20, 21, 22, 23) receiving said reference signal and a signal representative of the voltage of the supply battery source ($U_{Batt}$) and providing an output control signal to said switch control means (15, 30), said comparator comparing the respective input signals thereto and said output control signal controlling the controlled switch for switching operation between closed and open position in dependence on equality or non-equality of the predetermined reference signal and the signal representative of the supply source voltage ($U_{Batt}$) to provide to said heater (11) an average heater supply voltage ($U_{KEM}$) which will maintain said heater at said predetermined temperature.

5. The system of claim 4, wherein said electrical heater comprises a glow plug (11) in an internal combustion engine (E).

6. The system of claim 5, wherein said predetermined reference signal is applied to said comparator only during operation of the internal combustion engine (E).

7. Method of controlling the supply of electrical energy from a supply voltage source ($U_{Batt}$) to an electrical heater (11) having a controlled switch (10) serially connected between the heater and the supply voltage source ($U_{Batt}$), and means (15, 30) connected to and controlling the controlled switch (10) for periodically switching the controlled switch between closed (ON) and open (OFF) position, comprising the steps of determining the average supply voltage ($U_{KEM}$) required to maintain the heater at a predetermined temperature;

providing said supply source voltage at a level at least as high as said average supply voltage; and controlling the periodic switching cycle of the controlled switch as a function of the required average supply voltage ($U_{KEM}$), said controlling step including controlling the periodic switching cycle of the controlled switch (10) approximately in accordance with the relationship:

$$U_{KEM} = U_{Batt} \cdot \sqrt{t_{ON}/t_C}$$

wherein $U_{KEM}$ is the average supply voltage required to maintain the heater at the predetermined temperature;

$U_{Batt}$ is the voltage level of the supply source voltage;

$t_{ON}$ is the time duration of closed position of said controlled switch (10); and $t_C$ is the duration of the overall cycle or period of switching of the controlled switch, including the time interval of closed and open position thereof.

8. Method according to claim 7, including the step of sensing the supply source voltage level;

and wherein the step of controlling the period switching cycle comprises changing the periodic switching cycle as a function of change in supply source voltage level.

9. Method according to claim 7, wherein the step of controlling the periodic switching cycle comprises controlling the repetition rate of periodic switching of said controlled switch.

10. Method according to claim 7, wherein the step of controlling the periodic switching cycle of the controlled switch (10) comprises increasing the duration of closed position of said controlled switch upon drop of the supply source voltage level, and vice versa.

11. In an internal combustion engine (E): having a glow plug located within a combustion chamber of the engine and forming said electrical heater (11), a method to control the temperature of operation of the glow plug comprising carrying out the method as claimed in claim 7.

12. Method according to claim 7, wherein the electrical heater comprises a glow plug (11), installed in an internal combustion engine (E);

including the step of determining an engine operating or operation parameter;

and controlling the periodic switching of the controlled switch (10) as a function of said engine operating or operation parameter.

13. Method according to claim 12, wherein the electrical heater comprises a glow plug (11), installed in an internal combustion engine (E);

and wherein said step of controlling the periodic switching of the controlled switch as a function of an engine operating parameter comprises controlling the periodic switching of the controlled switch only when the engine (E) is operating.

14. Control system to control supply of electrical energy from a supply battery source ($U_{Batt}$) to an electrical heater (11) having a controlled switch (10) serially connected between the heater and the supply voltage source, and means (15, 30) connected to the controlled switch and controlling periodic switching of the controlled switch between closed (ON) and open (OFF) position, comprising means for controlling the periodic switching cycle of the controlled switch as a function of voltage across the electrical heater (11) required to maintain the heater at a predetermined temperature, said means being responsive to the supply source voltage level and varying the periodic switching of the controlled switch to maintain the average voltage across said electrical heater at the level required to maintain the heater at said predetermined temperature, said means to maintain the voltage across the heater at a predetermined level ($U_{KEM}$) to maintain the heater at said predetermined temperature comprising an operational amplifier (15);

a pulse generator (30) providing periodically rising and dropping output signals to the operational amplifier in accordance with a predetermined repetition frequency;

and means (20, 21, 22, 23) connected to a second input of the operational amplifier and providing a voltage thereto representative of said supply source voltage ($U_{Batt}$), said operational amplifier being connected to compare the respective inputs thereto and control the controlled switch for switching operation between closed and open position in dependence on equality of the voltage signal derived from the pulse generator (30) and voltage representative of the supply source voltage ($U_{Batt}$).

15. System according to claim 14, wherein said electrical heater comprises a glow plug (11) in an internal combustion engine (E).

16. System according to claim 14, including means (40, 41, 22, 23) for modifying the voltage applied to the operational amplifier (15) and representative of said supply source voltage upon variation of the supply source voltage beyond a predetermined limit.

17. System according to claim 16, wherein said means for modifying the voltage representative of the supply source voltage comprises at least one further operational amplifier (40, 41) connected for simulating change of the functional relationship of the supply source voltage and the average supply voltage ($U_{KEM}$) across the electrical heater (11) required to maintain the heater at the predetermined temperature.

18. System according to claim 14, wherein said pulse generator (30) comprises a multivibrator circuit.

19. System according to claim 18, wherein said electrical heater comprises a glow plug (11) in an internal combustion engine (E);

and wherein the repetition rate or frequency of the multivibrator is variable as a function of an operation or operating parameter of the engine (E).

20. System according to claim 19, wherein the repetition rate or frequency of the multivibrator is variable only during operation of the internal combustion engine.

* * * * *